United States Patent
Cho et al.

(10) Patent No.: US 10,230,551 B2
(45) Date of Patent: Mar. 12, 2019

(54) SIGNAL PROCESSING DEVICE AND ASSOCIATE EQUALIZATION CIRCUIT AND SIGNAL PROCESSING METHOD

(71) Applicant: MStar Semiconductor, Inc., Hsinchu Hsien (TW)

(72) Inventors: Ting-Nan Cho, Hsinchu Hsien (TW); Chia-Wei Chen, Hsinchu Hsien (TW); Kai-Wen Cheng, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/890,466

(22) Filed: Feb. 7, 2018

(65) Prior Publication Data

US 2019/0052485 A1 Feb. 14, 2019

(30) Foreign Application Priority Data

Aug. 8, 2017 (TW) .............................. 106126641 A

(51) Int. Cl.
*H04L 25/03* (2006.01)
*H04L 7/00* (2006.01)
*H04B 7/185* (2006.01)

(52) U.S. Cl.
CPC ...... *H04L 25/03057* (2013.01); *H04L 7/0079* (2013.01); *H04B 7/18523* (2013.01); *H04L 25/03885* (2013.01)

(58) Field of Classification Search
CPC ...................... H04B 7/18523; H04L 25/03885
See application file for complete search history.

(56) References Cited

U.S. PATENT DOCUMENTS 6,130,894 A    10/2000  Ojard et al.
2011/0242428 A1*  10/2011  Blouin .................. H04L 1/0047
                                                         348/726

* cited by examiner

*Primary Examiner* — Ross Varndell
(74) *Attorney, Agent, or Firm* — Edell, Shapiro & Finnan, LLC

(57) ABSTRACT

A signal processing device for a receiver includes: a descrambler, descrambling an input signal to generate a descrambled signal; a phase recovery circuit, performing phase recovery according to the descrambled signal to generate a phase recovered signal; an equalization module, performing equalization according to the phase recovered signal to generate an equalized signal; and a decoder, decoding the equalized signal to obtain data included in the input signal.

8 Claims, 6 Drawing Sheets ns (DVB-S2X) standard. As shown in FIG. 1, the signal
SIGNAL PROCESSING DEVICE AND ASSOCIATE EQUALIZATION CIRCUIT AND SIGNAL PROCESSING METHOD This application claims the benefit of Taiwan application Serial No. 106126641, filed on Aug. 8, 2017, the subject matter of which is incorporated herein by reference.

BACKGROUND OF THE INVENTION

Field of the Invention

The invention relates to a signal processing device and an associated equalization circuit and signal processing method, and more particularly, to a signal processing device for a Digital Video Broadcasting-Satellite Generation Two Extensions (DVB-S2X) receiver, and an associated equalization circuit and signal processing method.

Description of the Related Art

In general, before a transmitter transmits data, the transmitter adjusts in-phase components and quadrature components of data (e.g., exchanging in-phase components and quadrature components of data) by using a scrambler to scramble the data. In the Digital Video Broadcasting-Satellite Generation Two (DVB-S2) standard, for all modulation schemes, the number of constellation points in the descrambled data remains unchanged.

To improve spectrum efficiency, many modulation schemes are added in the Digital Video Broadcasting-Satellite Generation Two Extensions (DVB-S2X) standard. For a part of the modulation schemes (e.g., 8 amplitude phase-shift keying (APSK), 16 APSK, 128 APSK, or 256 APSK having a code rate of one of 20/30 and 22/30), the number of constellation points in the descrambled data is increased, while the decision region corresponding to each constellation points is reduced. This degrades the performance of a phase recovery circuit in a receiver, further affecting the performance of the receiver.

SUMMARY OF THE INVENTION

Therefore, the present invention provides a signal processing device for the Digital Video Broadcasting-Satellite Generation Two Extensions (DVB-S2X) standard and an associated equalization circuit and signal processing method to enhance the performance of a receiver.

According to an aspect of the present invention, a signal processing device for a receiver is disclosed. The signal processing device includes: a descrambler, descrambling an input signal to generate a descrambled signal; a phase recovery circuit, performing phase recovery according to the descrambled signal to generate a phase recovered signal; and equalization module, performing equalization according to the phase recovered signal to generate an equalized signal; and a decoder, decoding the equalized signal to obtain data included in the input signal.

According to another aspect of the present invention, an equalization circuit for a signal processing device is disclosed. The equalization circuit includes: a feedforward estimation circuit, generating an equalized signal according to a phase recovered signal and a slicing error signal; a descrambler, descrambling the equalized signal to generate a descrambled equalized signal; a decision-directed slicer, generating a sliced signal according to the descrambled equalized signal; a scrambler, scrambling the sliced signal to generate a scrambled sliced signal; and an arithmetic circuit, generating the slice error signal according to the equalized signal and the scrambled sliced signal.

According to another aspect of the present invention, a signal processing method for a receiver is provided. The signal processing method includes: descrambling an input signal to generate a descrambled signal; performing phase recovery according to the descrambled signal to generate a phase recovered signal; performing equalization according to the phase recovered signal to generate an equalized signal; and decoding the equalized signal to obtain data included in the input signal.

The above and other aspects of the invention will become better understood with regard to the following detailed description of the embodiments. The following description is made with reference to the accompanying drawings.

DETAILED DESCRIPTION OF THE INVENTION

Figure 1:
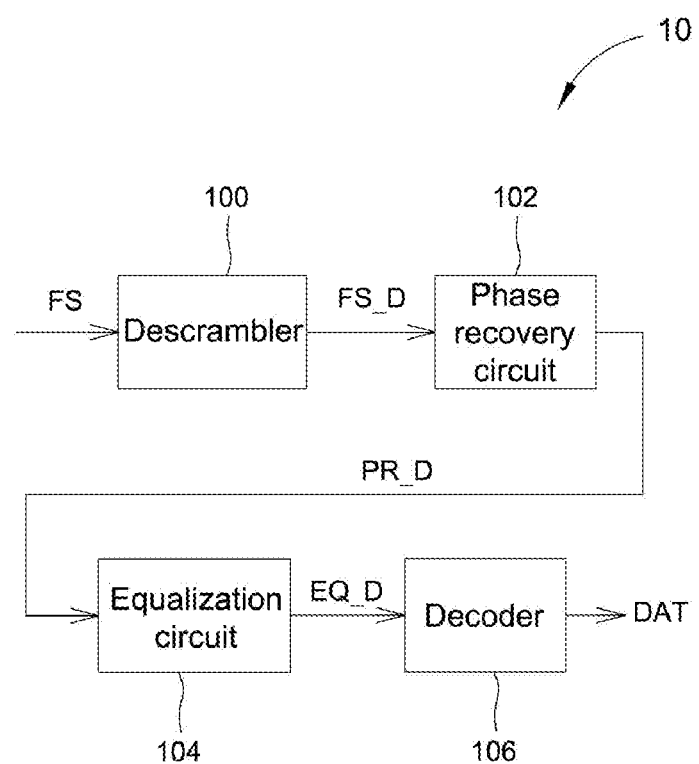
FIG. 1 is a block diagram of a signal processing device according to an embodiment of the present invention.

FIG. 1 shows a block diagram of a signal processing device 10 according to an embodiment of the present invention. The signal processing device 10 may be applied in, for example but not limited to, a receiver based on the Digital Video Broadcasting-Satellite Generation Two Extensions (DVB-S2X) standard. As shown in FIG. 1, the signal processing device 10 includes a descrambler 100, a phase recovery circuit 102, an equalization module 104 and a decoder 106.

Figure 2:
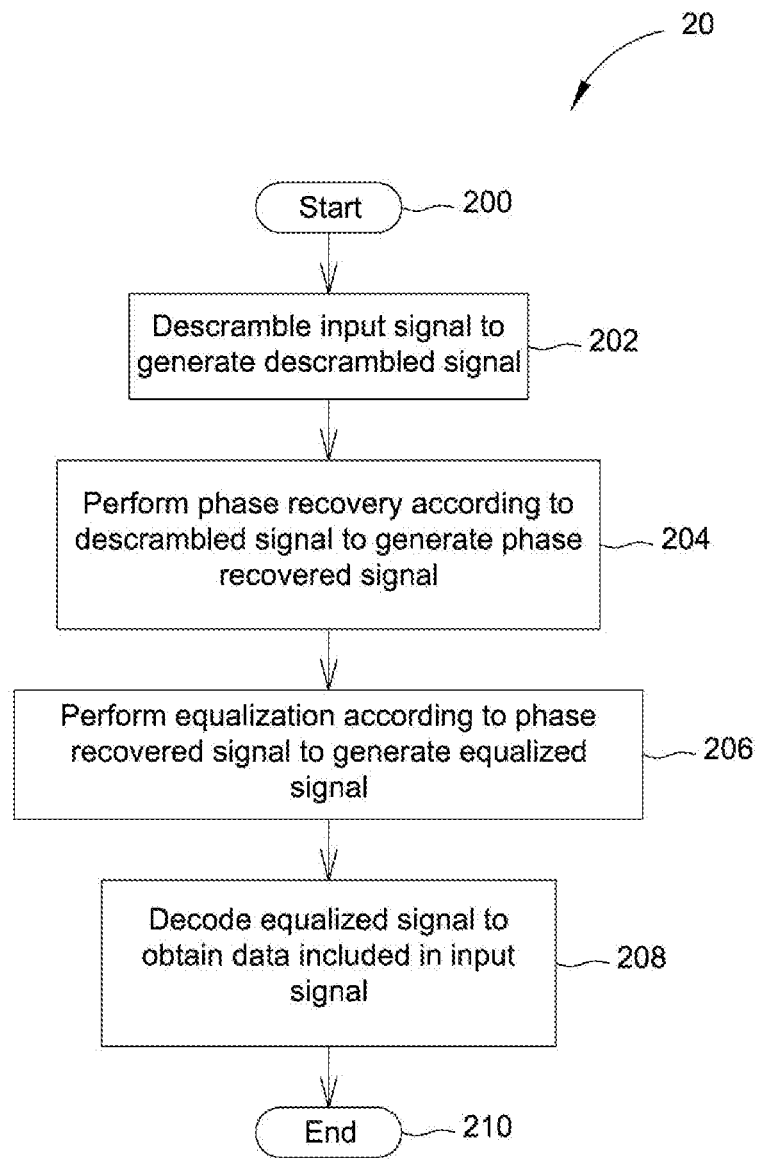
FIG. 2 is a flowchart of a synchronization method according to an embodiment of the present invention.

FIG. 2 shows a flowchart of a signal processing method 20 according to an embodiment of the present invention. Operation details associated with the signal processing device 10 are given below with reference to FIG. 1 and FIG. 2. The descrambler 100 receives an input signal FS, and descrambles the input signal FS to generate a descrambled signal FS_D (step 202) to reduce the number of constellation points corresponding to data included in the signal. The phase recovery circuit 102 performs phase recovery according to the descrambled signal FS_D to generate a phase recovered signal PR_D (step 204) to compensate the phase of the signal.

Figure 3A:
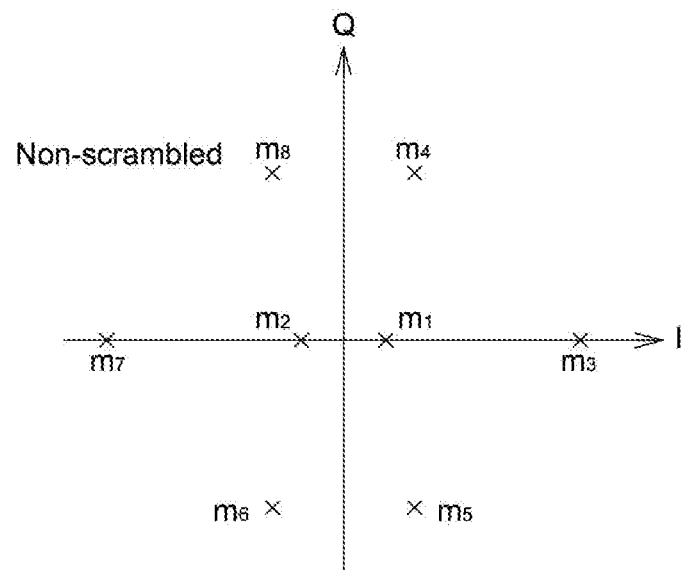
FIG. 3A and FIG. 3B are schematic diagrams of constellation points corresponding to data in embodiments of the present invention.
Figure 3B:
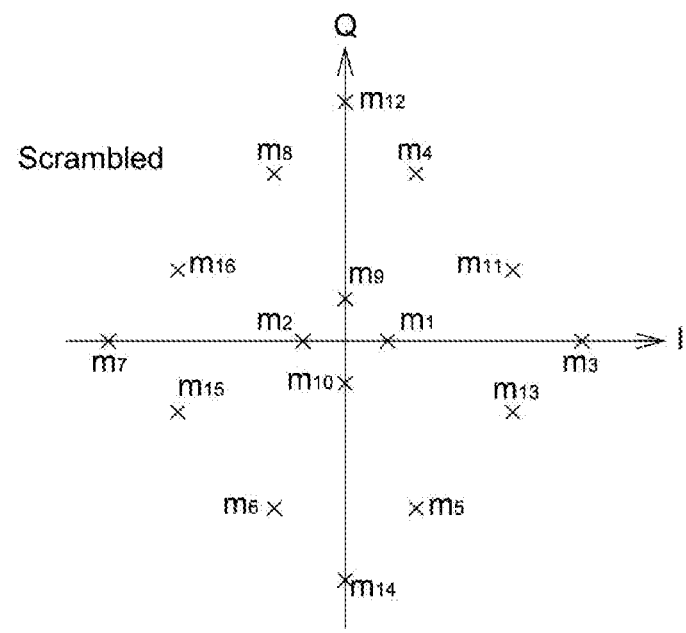

It should be noted that, in a conventional receiver, a descrambler is placed after a phase recovery circuit, meaning that an inputted signal on which the phase recovery circuit performs phase recovery is non-descrambled. However, when a modulation scheme adopted by a transmitter causes the number of constellation points corresponding to scrambled data to increase compared to that of descrambled data, a decision region corresponding to each constellation point is reduced, causing degraded performance of the phase recovery circuit in the conventional receiver. For example, when a transmitter adopts an 8 APSK modulation scheme of the DVB-S2X standard, non-scrambled data corresponds to constellation points m1 to m8, as shown in FIG. 3A, whereas scrambled data corresponds to constellation points m1 to m16, as shown in FIG. 3B.

Compared to a conventional receiver, in the present invention, the descrambler 100 is placed before the phase recovery circuit 102. Thus, a signal inputted to the phase recovery circuit 102 and to undergo phase recovery (i.e., the descrambled signal FS_D) undergoes a descrambling process, such that the number of constellation points corresponding to the data included in the descrambled signal is reduced. As a result, the decision region corresponding to each constellation point is increased, increasing the tolerance range of the phase recovery circuit 102 against noise. Accordingly, the performance of the phase recovery circuit 102 is effectively enhanced to further enhance the performance of the receiver.

Again referring to FIG. 1 and FIG. 2, the equalization module 104 performs equalization according to the phase recovered signal PR_D generated by the phase recovery circuit 102 to generate an equalized signal EQ_D (step 206). The decoder 106 decodes the equalized signal EQ_D to obtain data DAT included in the input signal FS (step 208). The decoder 106 may output the data DAT for a subsequent circuit for further processing. For example but not limited to, the subsequent circuit is an image processing circuit.

It should be noted that, various details and approaches for implementing the descrambler 100, the phase recovery circuit 102 and the decoder 106 are generally known to one person skilled in the art, and shall be omitted herein for brevity.

Figure 4:
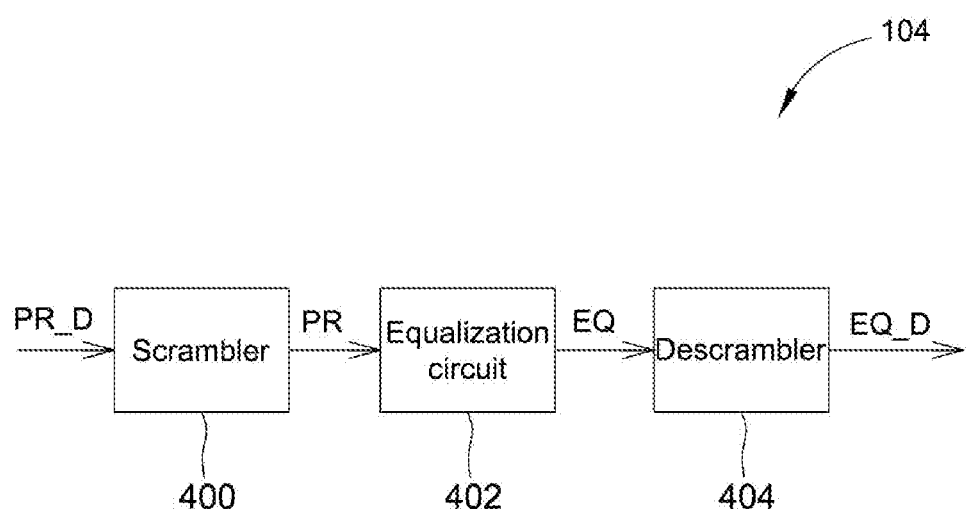
FIG. 4 is a block diagram of an equalization module according to an embodiment of the present invention.

FIG. 4 shows a block diagram of the equalization module 104 according to an embodiment of the present invention. The equalization module 104 includes a scrambler 400, an equalization circuit 402 and a descrambler 404. Because the number of constellation points corresponding to the data included in the phase recovered signal PR_D is less (e.g., 8 constellation points) after the input signal FS is descrambled by the descrambler 100, information associated with channel response is also decreased. If the equalization circuit 408 performs equalization directly according to the phase recovered signal PR_D, the quality of the equalized signal gets poorer. Thus, the equalization module 104 first scrambles the phase recovered signal PR_D by using the scrambler 400 to generate a scrambled phase recovered signal PR so as to increase the number of constellation points (e.g., 16 constellation points) corresponding to the data in the signal. Next, the equalization circuit 402 performs equalization according to the scrambled phase recovered signal PR to generate a scrambled equalized signal EQ. As such, the quality of the equalized signal is increased to further enhance the performance of the signal processing device 10. Again referring to FIG. 4, after the equalization performed by the equalization circuit 402 is completed, the signal processing device 10 uses the descrambler 404 to descramble the scrambled equalized signal EQ to generate the equalized signal EQ_D, and outputs the equalized signal EQ_D to the decoder 106 for decoding.

It should be noted that, various details and approaches for implementing the scrambler 400 and the descrambler 404 are generally known to one person skilled the art, and shall be omitted herein for brevity.

Figure 5:
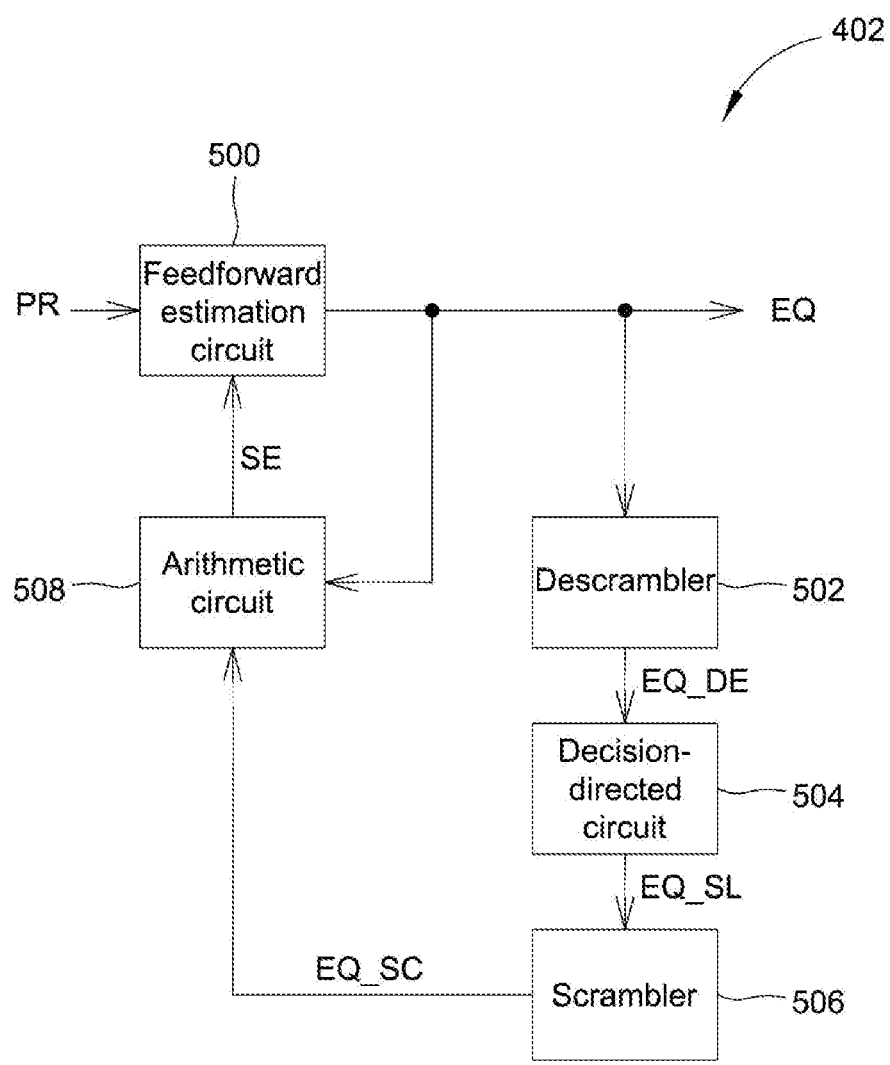
FIG. 5 is a block diagram of an equalization circuit according to an embodiment of the present invention.

FIG. 5 shows a block diagram of the equalization circuit 402 according to an embodiment of the present invention. The equalization circuit 402 includes a feedforward estimation circuit 500, a descrambler 502, a decision-directed slicer 504, a scrambler 506 and an arithmetic circuit 508. The feedforward estimation circuit 500 may be a filter, and compensates channel response of the scrambled phase recovered signal PR according to a slicing error signal SE generated by the arithmetic circuit 508 to generate the scrambled equalized signal EQ. The coefficient that the feedforward estimation circuit 500 uses to compensate the channel response changes according to the slicing error signal SE. To generate the slicing error signal SE, the decision-directed slicer 504 determines an ideal constellation point corresponding to the scrambled equalized signal EQ, so as to allow the arithmetic circuit 508 to calculate a difference between the scrambled equalized signal EQ and the corresponding ideal constellation point to serve as the slicing error signal SE.

It should be noted that, the equalization circuit 402 further uses the descrambler 502 to descramble the scrambled equalized signal EQ having a larger number of constellation points to generate an equalized signal EQ_DE having a smaller number of constellation points, so as to reduce the number of constellation points corresponding to the equalized signal (e.g., reducing from 16 to 8) and increase the decision range corresponding to each constellation point. The decision-directed slicer 504 determines an ideal constellation point corresponding to the scrambled equalized signal EQ according to the equalized signal EQ_DE having a smaller number of constellation points to generate a sliced signal EQ_SL. In this situation, the tolerance range of the decision-directed slicer 504 against noise can be increased to enhance the performance of the equalization circuit 402.

Next, according to the sliced signal EQ_SL generated by the decision-directed slicer 504, the scrambler 506 scrambles the sliced signal EQ_SL to generate a scrambled sliced signal EQ_SC, and outputs the scrambled sliced signal EQ_SC to the arithmetic circuit 508. As such, the arithmetic circuit 508 can calculate the difference between the scrambled equalized signal EQ and the scrambled sliced signal EQ_SC to generate the slicing error signal SE.

It should be noted that, various details and approaches for implementing the feedforward estimation circuit 500, the descrambling circuit 502, the decision-directed slicer 504, the scrambler 506 and the arithmetic circuit 508 are generally known to one person skilled in the art, and shall be omitted herein for brevity.

It should be noted that, the equalization module 104 shown in FIG. 4 is merely an embodiment of the present invention. In another embodiment, the equalization module 104 may exclude the scrambler 406 and the descrambler 410. In other words, in this embodiment, the equalization circuit 408 performs equalization directly according to the phase recovered signal PR_D to generate the equalized signal EQ_D, and outputs the equalized signal EQ_D to the decoder 106 for decoding.

It should be noted that, the equalization circuit 402 shown in FIG. 5 is merely an embodiment of the present invention. In another embodiment, the equalization circuit 402 may exclude the descrambler 502 and the scrambler 506. In other words, in this embodiment, the decision-directed slicer 504 determines an ideal constellation point corresponding to the scrambled equalized signal EQ directly according to the scrambled equalized signal EQ, and outputs the ideal constellation point to the arithmetic circuit 508 for calculating the difference between the constellation point corresponding to the scrambled equalized signal EQ and the ideal constellation point determined by the decision-directed slicer 504 to serve as the slicing error signal SE.

Figure 6:
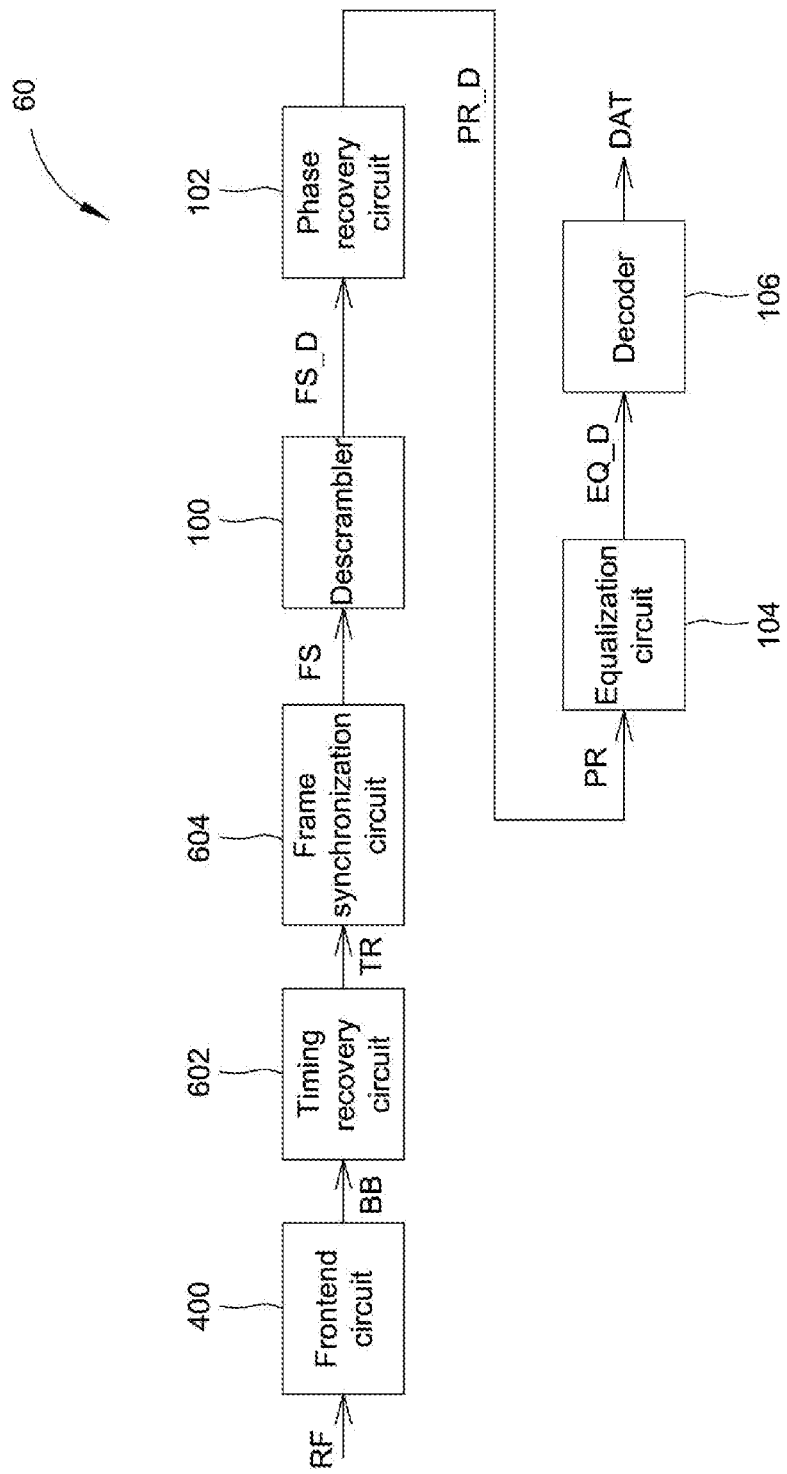
FIG. 6 is a block diagram of a signal processing device according to another embodiment of the present invention.

FIG. 6 shows a block diagram of a signal processing device 60 according to another embodiment of the present invention. The signal processing device 60 in FIG. 6 is similar to the signal processing device 10 in FIG. 1, and elements with similar functions use the same denotations. Compared to the signal processing device 10, the signal processing device 60 further includes a frontend circuit 600, a timing recovery circuit 602 and a frame synchronization circuit 604. The frontend circuit 600 receives a radio-frequency signal RF, down-converts the frequency the radio-frequency signal RF to a baseband, and samples the down-converted radio-frequency signal RF by using a predetermined sampling rate to generate a baseband signal BB. Because the timing of the radio-frequency signal RF is affected by the transmission channel and thus changed, the timing recovery circuit 602 compensates the error sampling timing used for sampling the baseband signal BB (i.e., performing timing recovery) to output a timing recovered signal TR to the frame synchronization circuit 604. The frame synchronization circuit 604 detects a frame structure (e.g., detecting whether the timing recovered signal TR uses a pilot sub-frame, and the length of a frame in the timing recovered signal TR), and extracts the timing recovered signal TR according to the detected frame structure to generate an input signal FS inputted to the descrambler 100.

It should be noted that, given that the number of constellation points corresponding to the signal inputted to the phase recovery circuit 102 is reduced, the descrambler 100 may be configured at other positions. In one embodiment, the descrambler 100 may be configured between the timing recovery circuit 602 and the frame synchronization circuit 604. In other embodiment, the descrambler 100 is configured between the frontend circuit 600 and the timing recovery circuit 602.

While the invention has been described by way of example and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing device for a receiver, comprising:
   a descrambler, descrambling an input signal to generate a descrambled signal;
   a phase recovery circuit, performing phase recovery according to the descrambled signal to generate a phase recovered signal;
   an equalization module, performing equalization according to the phase recovered signal to generate an equalized signal; and
   a decoder, decoding the equalized signal to obtain data included in the input signal,
   wherein the equalization module comprises:
   a first scrambler, scrambling the phase recovered signal to generate a scrambled phase recovered signal;
   an equalization circuit, performing the equalization according to the scrambled phase recovered signal to generate a scrambled equalized signal; and
   a first descrambler, descrambling the scrambled equalized signal to generate the equalized signal.

2. The signal processing device according to claim 1, further comprising:
   a frontend circuit, converting a radio-frequency signal to a baseband signal;
   a timing recovery circuit, performing timing recovery on the baseband signal to generate a timing recovered signal; and
   a frame synchronization circuit, performing frame synchronization according to the timing recovered signal to generate a frame synchronized signal;
   wherein, the descrambler is coupled between the frame synchronization circuit and the phase recovery circuit, and the input signal is the frame synchronized signal.

3. The signal processing device according to claim 1, wherein the equalization circuit comprises:
   a feedforward estimation circuit, performing feedforward estimation according to the scrambled phase recovered signal and a slicing error signal to generate the scrambled equalized signal;
   a second descrambler, descrambling the scrambled equalized signal to generate another equalized signal;
   a decision-directed slicer, slicing the another equalized signal to generate a sliced signal;
   a second scrambler, scrambling the sliced signal to generate a scrambled sliced signal; and
   an arithmetic circuit, generating the slicing error signal to the feedforward estimation circuit according to the scrambled sliced signal and the scrambled equalized signal.

4. A signal processing method for a receiver, comprising:
   descrambling an input signal to generate a descrambled signal;
   performing phase recovery according to the descrambled signal to generate a phase recovered signal;
   performing equalization according to the phase recovered signal to generate an equalized signal; and
   decoding the equalized signal to obtain data included in the input signal,
   wherein the step of performing the equalization according to the phase recovered signal to generate the equalized signal comprises:
   scrambling the phase recovered signal to generate a scrambled phase recovered signal;
   performing the equalization according to the scrambled phase recovered signal to generate a scrambled equalized signal; and
   descrambling the scrambled equalized signal to generate the equalized signal.

5. The signal processing method according to claim 4, further comprising:
   converting a radio-frequency signal to a baseband signal;
   performing timing recovery on the baseband signal to generate a timing recovered signal; and
   performing frame synchronization according to the timing recovered signal to generate a frame synchronized signal;
   wherein, the input signal is the frame synchronized signal.

6. The signal processing method according to claim 5, wherein the step of performing the equalization signal according to the scrambled phase recovered signal to generate the scrambled equalized signal comprises:
   performing feedforward estimation according to the scrambled phase recovered signal and a slicing error signal to generate the scrambled equalized signal;
   descrambling the scrambled equalized signal to generate another equalized signal;
   slicing the another equalized signal to generate a sliced signal;
   scrambling the sliced signal to generate a scrambled sliced signal; and generating the slicing error signal according to the scrambled sliced signal and the scrambled equalized signal.

7. A signal processing device for a receiver, comprising:
- a first scrambler, scrambling a phase recovered signal, generated by performing phase recovery according to descrambled signal derived from an input signal, to generate a scrambled phase recovered signal;
- an equalization circuit, performing equalization according to the scrambled phase recovered signal to generate a scrambled equalized signal; and
- a first descrambler, descrambling the scrambled equalized signal to generate an equalized signal, which is provided to a decoder that decodes the equalized signal to obtain data included in the input signal.

8. The signal processing device for a receiver of claim 7, wherein the equalization circuit comprises:
- a feedforward estimation circuit, performing feedforward estimation according to the scrambled phase recovered signal and a slicing error signal to generate the scrambled equalized signal;
- a second descrambler, descrambling the scrambled equalized signal to generate another equalized signal;
- a decision-directed slicer, slicing the another equalized signal to generate a sliced signal;
- a second scrambler, scrambling the sliced signal to generate a scrambled sliced signal; and
- an arithmetic circuit, generating the slicing error signal to the feedforward estimation circuit according to the scrambled sliced signal and the scrambled equalized signal.

\* \* \* \* \*